(12) United States Patent
Yang

(10) Patent No.: US 6,525,830 B1
(45) Date of Patent: Feb. 25, 2003

(54) PRINTING METHOD FOR IMPROVING SPEED

(75) Inventor: Seung-Sik Yang, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 84 days.

(21) Appl. No.: 09/657,810

(22) Filed: Sep. 8, 2000

Related U.S. Application Data

(63) Continuation-in-part of application No. 09/186,363, filed on Nov. 5, 1998, now abandoned.

(51) Int. Cl.⁷ .............................................. G06K 15/00
(52) U.S. Cl. ................................... 358/1.1; 358/426.01
(58) Field of Search .............................. 358/1.9, 1.11, 358/1.12, 1.15, 1.18, 1.1

(56) References Cited

U.S. PATENT DOCUMENTS

| 5,113,494 A | * | 5/1992 | Menendez | 395/163 |
|---|---|---|---|---|
| 5,533,175 A | | 7/1996 | Lung et al. | 395/115 |
| 5,640,607 A | * | 6/1997 | Murray | 395/888 |
| 5,659,669 A | * | 8/1997 | Narukawa | 395/102 |
| 5,737,501 A | | 4/1998 | Tsunekawa | 395/102 |
| 5,812,743 A | * | 9/1998 | Takahashi | 395/110 |
| 6,078,399 A | * | 6/2000 | Kadota | 358/1.13 |
| 6,147,767 A | * | 11/2000 | Petteruti | 358/1.18 |
| 2001/0047443 A1 | * | 11/2001 | Ito | 707/107 |

* cited by examiner

Primary Examiner—Jerome Grant, II
(74) Attorney, Agent, or Firm—Robert E. Bushnell, Esq.

(57) ABSTRACT

In a printing method, a printer driver and a printer employ the same image compression and decompression methods so as to improve printing speed. Image data compressed by a predetermined compression method is received from a printer driver of a host computer by a printer, and the received compressed image data are decompressed using the same compression method and are printed. A scanline method is, preferably, employed as the compression and decompression methods.

23 Claims, 3 Drawing Sheets

PRINTING METHOD FOR IMPROVING SPEED

CROSS-REFERENCE TO RELATED APPLICATIONS

This application is a continuation-in-part of Applicant's Ser. No. 09/186,363 filed in the U.S. Patent & Trademark Office on Nov. 5, 1998, and assigned to the assignee of the present invention, now abandoned.

CLAIM OF PRIORITY

This application makes reference to, incorporates the same herein, and claims all benefits accruing under 35 U.S.C. §119 from an application for PRINTING METHOD FOR IMPROVING PRINTING SPEED earlier filed in the Korean Industrial Property Office on Nov. 6, 1997 and there duly assigned Ser. No. 58302/1997.

BACKGROUND OF THE INVENTION

1. Technical Field

The present invention relates to a printing method and, more particularly, to a printing method wherein a printer driver and a printer employ the same image compression method so as to enhance printing speed, and wherein image data are compressed using a scanline method and the compressed image data are sent to a printer engine in a printer driver module, whereupon the compressed image data are decompressed in real time and simultaneously printed out in the printer.

2. Related Art

Recently, computers have become suitable for use in multimedia, and users' documents have become complicated and variable in form due to increasing graphics and hypertexts. Accordingly, a printer with high performance is required to handle a large amount of print data.

In general, printing is performed as explained below. A user gives instruction for printing via an application program, and a host computer converts documents that are to be printed, by means of a printer driver in a host computer, into commands readable by a printer (for example, PCL command for PCL emulation). The converted commands are downloaded to the printer via a serial or parallel port of the host computer.

The printer then interprets the downloaded data, converts data corresponding to one page into bit map data to be readable by the printer, and transmits the same to an engine of the printer so as to perform the printing operation.

When print data are transmitted from a printer driver to a printer, the printer driver compresses image data included in the print data using run-length, tagged image file format (TIFF), or the delta-row method.

Meanwhile, the printer receives the compressed print data and decompresses the data to reproduce the original print data. Then, the printer compresses print data by employing the run-length method, which serves to compress data by word unit. In order to print the compressed print data via a printer engine, the printer decompresses the print data in real-time and transmits that decompressed data to the printer engine.

In the above-described method, print data are compressed and downloaded by a host computer, and a printer decompresses the data and compresses the data again for use in the printer. As a result, printing speed is lowered.

SUMMARY OF THE INVENTION

It is, therefore, an object of the present invention to provide a method wherein a host computer and a printer employ the same compression method so that data need not be compressed twice.

It is an additional object of the present invention to provide a method wherein image data are compressed using a scanline method and the compressed image data are sent to a printer engine in a printer driver module, whereupon the compressed image data are decompressed in real time and simultaneously printed out in the printer.

According to one aspect of the present invention, there is provided a printing method for improving printing speed, including the steps of: transmitting print data to a printer driver; compressing the transmitted print data using a first method and downloading the print data to a printer; and decompressing the downloaded print data using the above-mentioned first method and printing the same.

Preferably, the scanline method is employed as the first method, and the decompression is performed in real-time.

According to another aspect of the present invention, there is provided a printing method for improving printing speed, including the steps of: transmitting print data from a host computer to a printer driver; classifying the received data into image data and text data; compressing the image data using a first method, font-mapping the text data, and downloading the image and text data to a printer; decompressing the downloaded image data in real-time by employing the first method, transmitting font information of the text data, and printing the image and text data.

Again, preferably, the scanline method is employed as the first method.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those having skill in the art.

Figure 1:
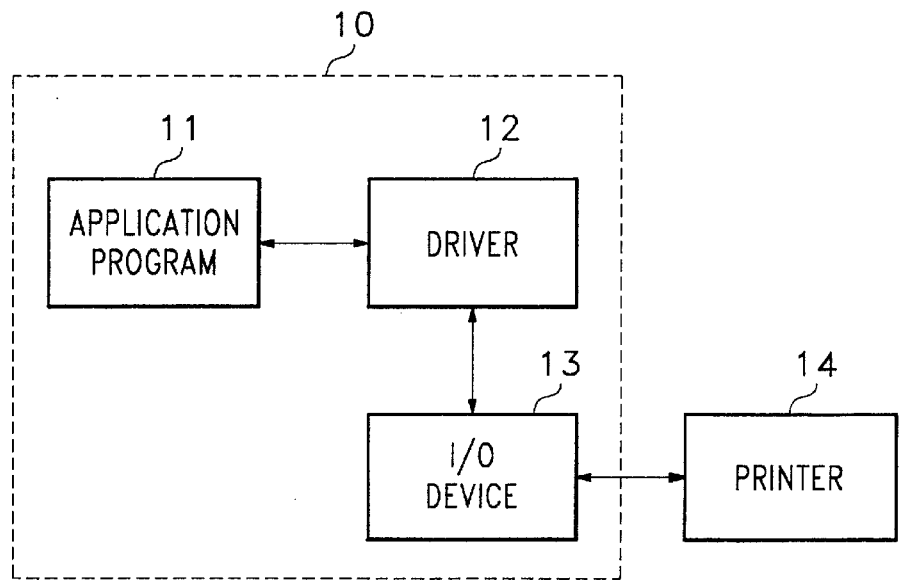
FIG. 1 is a block diagram showing a print environment of the present invention.

A print environment for the present invention can be described with reference to FIG. 1.

First, a printer driver 12 converts print data requested by an application program 11 (e.g. wordprocessor) into commands readable by a printer 14, compresses the converted commands, and transmits such data to the printer 14 by way of an input/output (I/O) device 13. The printer 14 that is connected to the I/O device 13 interprets the transmitted data and prints data corresponding to one page.

Figure 2:
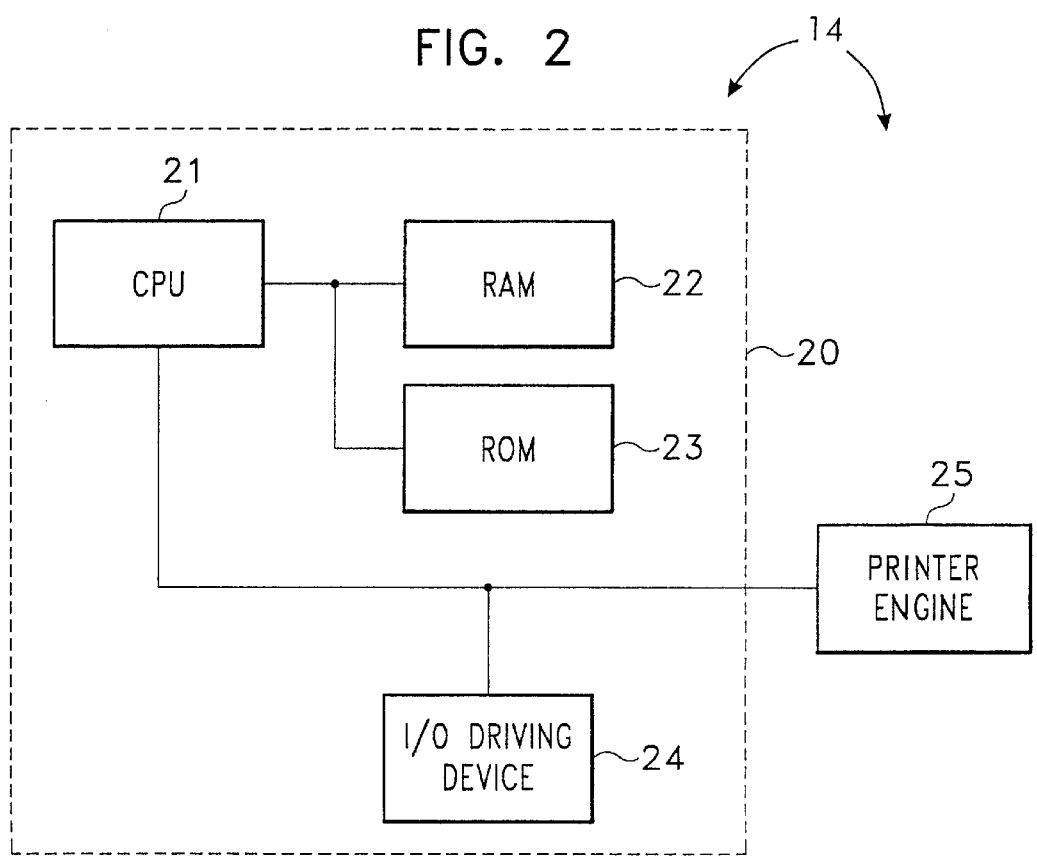
FIG. 2 is a block diagram showing a laser printer of the present invention.

Referring to FIG. 2, a laser printer 14 of the present invention comprises a controller 20 for reading print data transmitted from a host computer 10 and controlling a printing operation, and a printer engine 25 for printing under the control of the controller 20.

The controller 20 consists of a central processing unit (CPU) 21 for decompressing the print data and controlling a printing operation, a RAM 22, a ROM 23, and an I/O driving device 24 for controlling the printer engine 25.

Figure 3:
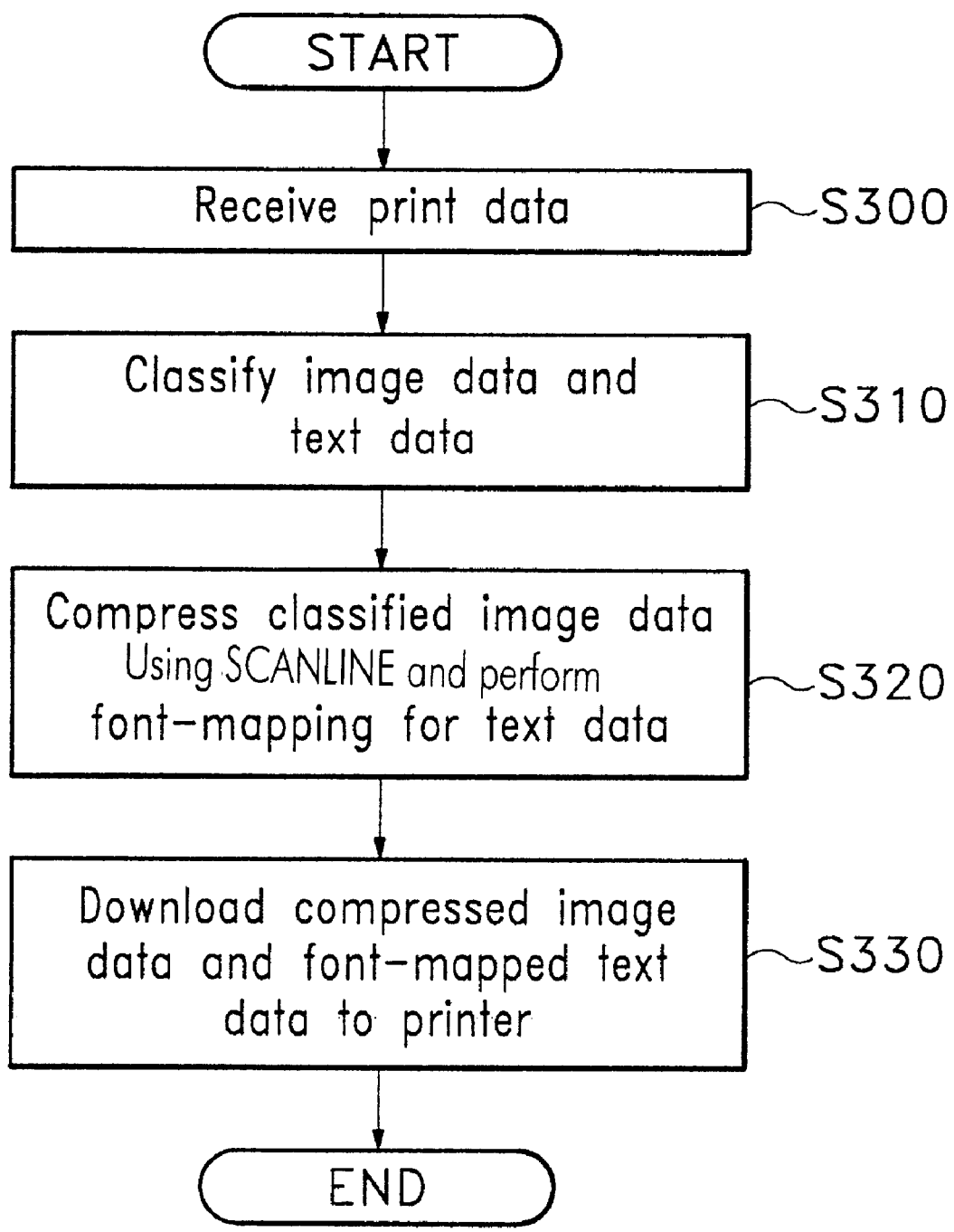
FIG. 3 is a flow diagram representing a method for processing print data in a host computer to improve printing speed according to the present invention.
Figure 4:
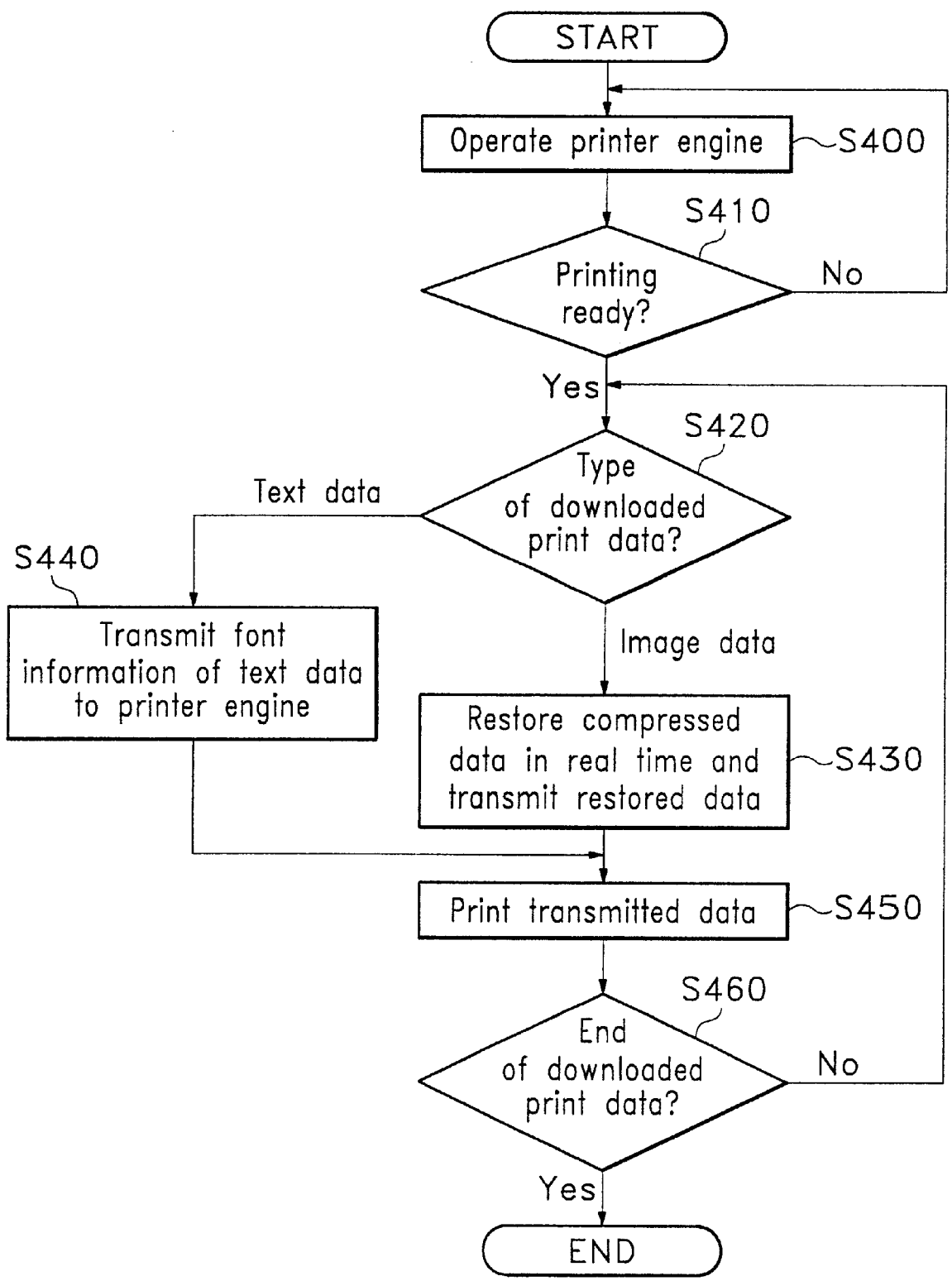
FIG. 4 is a flow diagram representing a method for processing print data in a printer to improve printing speed according to the present invention.

A method for improving printing speed according to the present invention will be explained with reference to FIGS. 3 and 4.

First, a method for processing print data in a host computer to improve printing speed according to the present invention can be explained by reference to FIG. 3.

The printer driver 12 receives print data from the application program 11 (for example, a word processor) at step S300.

After receipt of print data from the application program 11, the printer driver 12 classifies the received print data into image data and text data at step S310.

The printer driver 12 compresses the classified image data using a predetermined method, and performs font-mapping for the text data at step S320. Preferably, the predetermined method of compression is the scanline method. This method is generally known to those of skill in the art, and thus an explanation thereof will be omitted.

The printer driver 12 then downloads the compressed image data and the font-mapped text data to the printer 14 by way of the I/O device 13 at step S330.

A method for processing printing data to improve printing speed according to the present invention will be explained by reference to FIG. 4.

The printer 14 receives print data downloaded from a host computer and operates a printer engine at step S400. If the printer 14 is a laser printer, then a print environment recognition operation (e.g., warming up or initialization) is performed at this point and prior to printing.

After warming up or initializing the printer engine so that the printer is ready (step S410) and printing is possible, the controller 20 of the printer 14 determines the type of print data downloaded to the printer 14 at step S420. If the printer 14 is not yet warmed up or initialized at step S410, operation of the printer 14 continues at step S400 until it is warmed up.

If, as a result of step S420, it is determined that the downloaded print data are image data, the controller 20 decompresses the data in real-time using a method which is the same as or compatible with the compression method employed by the printer driver 12, and transmits the decompressed data to the printer engine 25 at step S430. For example, if the printer driver 12 compresses image data using the scanline compression method, the controller 20 decompresses the image data using the same method (i.e., the scanline decompression method).

In a prior printing method a printer driver compresses image data by employing the run-length, TIFF, or delta-row method, and downloads the compressed data. However, the run-length method employed by a printer is different from that employed by a printer driver in that the former compresses data by word unit. Therefore, these two methods are incompatible with each other. However, in the present invention, the printer driver 12 and the printer 14 employ the same compression method. Thus, the data can be decompressed in real-time and transmitted to the printer engine 25.

In another prior printing method, image data are compressed in accordance with the TIFF method in a Windows GDI module, and the compressed image data are continuously decompressed in a printer drive module using the TIFF method. Then, the decompressed image data are compressed again in a printer, and then decompressed in real time and simultaneously printed out in the printer.

However, in the present invention, image data are compressed directly using the scanline method, and sent to the printer engine 25 in the printer driver module. Then, the compressed image data are decompressed in real time using the scanline method, and simultaneously printed out in the printer part.

If it is determined at step S420 that the type of print data downloaded to the printer 14 is text data, font information of the text data is transmitted to the printer engine 25 at step S440.

The decompressed image data and font information are transmitted to the printer engine 25, which then prints the transmitted data at step S450.

The controller 20 returns to step S420 to repeat print jobs until there are no print data being downloaded to the printer 14 at step S460.

In contrast to the first prior method, where the data compressed by and downloaded from a host computer are decompressed and compressed again at a printer, the present invention adopts the same compression method for a host computer and a printer. Moreover, in the printing method of the present invention, the compressed data is decompressed in real-time at the printer. As a result, when performing data printing, the time required for data storing and recompression is eliminated, thereby improving printing speed.

Finally, in contrast to the second prior method, which involves compression and decompression in a Windows GDI module and a printer driver module, respectively, and again in a printer, the present-invention involves compression and decompression using the scanline method in real time.

This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A method for processing print data in a host computer for provision to a printer, comprising the steps of:

transmitting the print data from an application program to a printer driver;

compressing image data of the print data in accordance with a given compression method;

font-mapping text data of the print data; and downloading the compressed image data and the font mapped text data to the printer;

wherein said printer decompresses the compressed image data using a decompression method corresponding to the given compression method employed in compressing the image data in the host computer.

2. The method according to claim 1, wherein said given compression method and said decompression method comprise respective scanline methods.

3. The method according to claim 2, wherein after the downloading step and prior to decompressing of the compressed image data by said printer, the following steps are performed:

determining whether printing is possible;

when printing is not possible, continuing with operation of the printer; and when printing is possible, determining a type of downloaded print data.

4. The method according to claim 1, wherein after the downloading step and prior to decompressing of the compressed image data by said printer, the following steps are performed:

determining whether printing is possible;

when printing is not possible, continuing with operation of the printer; and when printing is possible, determining a type of downloaded print data.

5. A method for processing print data in a printer, comprising the steps of:

downloading the print data from a host computer;

receiving the downloaded print data;

operating a printer engine;

determining a type of the downloaded print data; and when the downloaded print data is text data, transmitting font information of the text data to the printer engine, and printing the transmitted font information.

6. The method according to claim 5, further comprising the steps of:

determining whether downloading of the print data has ended;

when the downloading of the print data has not ended, returning to the step of determining the type of downloaded print data; and when the downloading of the print data has ended, terminating the method.

7. The method according to claim 6, further comprising the steps, after said operating step, of:

determining whether printing is possible;

when printing is not possible, continuing with the operating step; and when printing is possible, executing the step of determining the type of downloaded print data.

8. The method according to claim 5, further comprising the steps, after said operating step, of:

determining whether printing is possible;

when printing is not possible, continuing with the operating step; and when printing is possible, executing the step of determining the type of downloaded print data.

9. The method according to claim 5, further comprising the step of:

when the downloaded print data is image data, restoring compressed data in real time to obtain restored data, transmitting the restored data, and printing the transmitted data.

10. The method according to claim 9, wherein the compressed data is a result of compressing using a scanline method, and the restoring step comprises using a scanline method to restore the compressed data.

11. The method according to claim 9, further comprising the steps of:

determining whether downloading of the print data has ended;

when the downloading of the print data has not ended, returning to the step of determining the type of downloaded print data; and when the downloading of the print data has ended, terminating the method.

12. The method according to claim 11, further comprising the steps, after said operating step, of:

determining whether printing is possible;

when printing is not possible, continuing with the operating step; and when printing is possible, executing the step of determining the type of downloaded print data.

13. The method according to claim 9, further comprising the steps, after said operating step, of:

determining whether printing is possible;

when printing is not possible, continuing with the operating step; and when printing is possible, executing the step of determining the type of downloaded print data.

14. A method for processing print data in a printing system which includes a host computer and a printer, comprising the steps of:

transmitting the print data from an application program to a printer driver in the host computer;

compressing image data of the print data;

font-mapping text data of the print data;

downloading the compressed image data and the font-mapped text data from the host computer to the printer;

receiving the downloaded data in the printer;

operating a printer engine;

determining a type of the downloaded data; and restoring compressed data in real time to obtain restored data and printing the restored data when the downloaded data is compressed image data.

15. The method according to claim 14, wherein the compressing step comprises compressing using a scanline method, and said restoring step comprises decompressing using the scanline method.

16. The method according to claim 14, further comprising the steps of:

determining whether downloading of the print data has ended;

when the downloading of the print data has not ended, returning to the step of determining the type of downloaded print data; and when the downloading of the print data has ended, terminating the process.

17. The method according to claim 16, further comprising the steps, after said operating step, of:

a determining whether printing is possible;

when printing is not possible, continuing with the operating step; and when printing is possible, executing the step of determining the type of downloaded print data.

18. The method according to claim 14, further comprising the steps, after said operating step, of:

determining whether printing is possible;

when printing is not possible, continuing with the operating step; and when printing is possible, executing the step of determining the type of downloaded print data.

19. A method for processing print data in a printer, comprising the steps of:

downloading the print data from a host computer;

receiving the downloaded print data;

operating a printer engine;

determining a type of the downloaded print data; and when the downloaded print data is image data, restoring compressed data in real time to obtain restored data, transmitting the restored data, and printing the transmitted data.

20. The method according to claim 19, wherein the compressed data is a result of compressing using a scanline method, and the restoring step comprises using a scanline method to restore the compressed data.

21. The method according to claim 19, further comprising the steps of:

determining whether downloading of the print data has ended;

when the downloading of the print data has not ended, returning to the step of determining the type of downloaded print data; and when the downloading of the print data has ended, terminating the method.

22. The method according to claim 21, further comprising the steps, after said operating step, of:

determining whether printing is possible;

when printing is not possible, continuing with the operating step; and when printing is possible, executing the step of determining the type of downloaded print data.

23. The method according to claim 19, further comprising the steps, after said operating step, of:

determining whether printing is possible;

when printing is not possible, continuing with the operating step; and when printing is possible, executing the step of determining the type of downloaded print data.

\* \* \* \* \*